(12) United States Patent
Shibauchi et al.

(10) Patent No.: US 7,005,153 B1
(45) Date of Patent: Feb. 28, 2006

(54) METHOD OF PRODUCING LAMINATED FOOD AND A DEVICE THEREOF AND LAMINATED CHEESE FOOD THEREBY PRODUCED

(75) Inventors: Yoshito Shibauchi, Sayama (JP); Hiroshi Kondo, Kawagoe (JP); Hiroshi Aoyama, Sayama (JP); Masayuki Goda, Kawagoe (JP)

(73) Assignee: Snow Brand Milk Products Co., LTD., Sapporo (JP)

( * ) Notice: Subject to any disclaimer, the term of this patent is extended or adjusted under 35 U.S.C. 154(b) by 821 days.

(21) Appl. No.: 09/675,671

(22) Filed: Sep. 29, 2000

(30) Foreign Application Priority Data

| Sep. 29, 1999 | (JP) | ................................ 11-276280 |
| Sep. 13, 2000 | (JP) | ............................. 2000-278540 |
| Sep. 13, 2000 | (JP) | ............................. 2000-278623 |

(51) Int. Cl.
*A23C 19/09* (2006.01)

(52) U.S. Cl. .......................... 426/274; 426/89; 426/92; 426/249; 426/582

(58) Field of Classification Search ................ 426/249, 426/89, 92, 302, 303, 307, 274, 582
See application file for complete search history.

(56) References Cited

U.S. PATENT DOCUMENTS

| 4,496,593 A | * | 1/1985 | Caille ........................... 426/89 |
| 4,670,276 A | * | 6/1987 | Nakajima .................... 426/274 |
| 4,832,970 A | * | 5/1989 | Mally et al. ................. 426/274 |
| 5,023,096 A | * | 6/1991 | Plochman ..................... 426/89 |
| 5,194,283 A | * | 3/1993 | Dupas et al. ............... 426/582 |
| 5,928,692 A | * | 7/1999 | Mayfield ...................... 426/89 |

FOREIGN PATENT DOCUMENTS

JP 5847432 3/1983

(Continued)

OTHER PUBLICATIONS

Fresno Bee, Jan. 12, 1994.*

*Primary Examiner*—Lien Tran
(74) *Attorney, Agent, or Firm*—Birch, Stewart, Kolasch & Birch, LLP

(57) ABSTRACT

Fluid food materials which solidify when cooled are quantitatively supplied successively at a certain thickness in a plate form on cooling and carrying sides; of two cooling and carrying devices, cooled while being carried to form two monolayer platy food materials, and the two platy food materials are bonded and united making use of the surface not yet completely cooled and solidified of the monolayer platy food materials, and thereby producing a layered laminated cheese food and the like consisting of two layers. In order to obtain a three-or-more-layer laminated structure, the fluid food materials which solidify when cooled are quantitatively supplied successively at a certain thickness in a plate form on the cooling and carrying sides of the cooling and carrying devices, cooled while being carried to form monolayer platy food materials, or if necessary, more fluid food materials which solidify when cooled are quantitatively supplied successively at a certain thickness in a plate form over the platy food materials, cooled while being carried, thereby forming multilayer platy food materials, and/or the platy food materials are bonded and united to form multilayer platy food materials, and the fluid food materials are quantitatively supplied successively between the two monolayer and/or multilayer platy food materials in order to unite the two platy food materials and the fluid food materials comprising the layers between the two platy food materials.

5 Claims, 8 Drawing Sheets

FOREIGN PATENT DOCUMENTS

| | | |
|---|---|---|
| JP | 3201952 | 9/1991 |
| JP | 4179442 | 6/1992 |
| JP | 5146250 | 6/1993 |
| JP | 5336870 | 12/1993 |
| JP | 8196209 | 8/1996 |
| JP | 8256686 | 10/1996 |

\* cited by examiner

F I G. 3
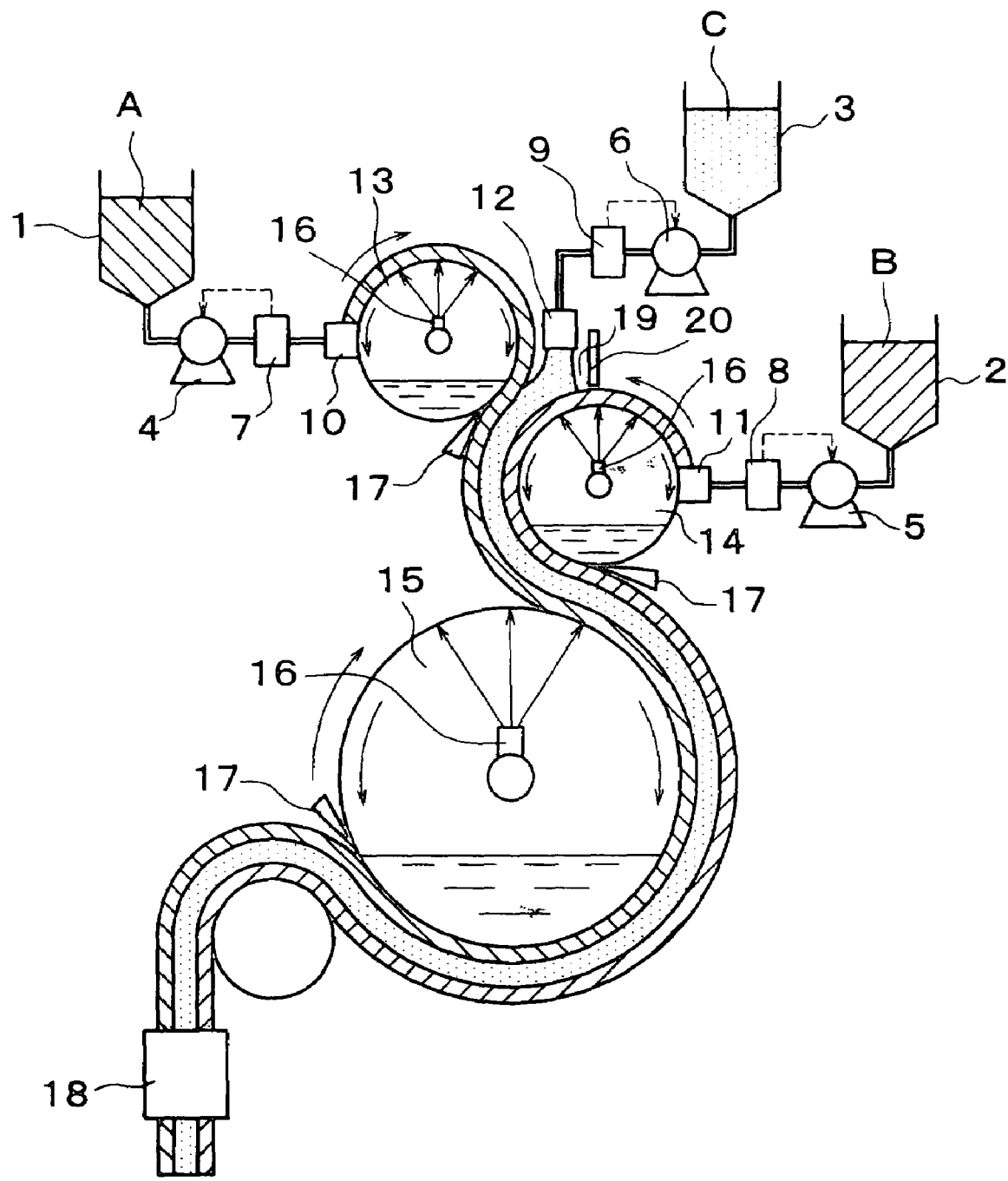

METHOD OF PRODUCING LAMINATED FOOD AND A DEVICE THEREOF AND LAMINATED CHEESE FOOD THEREBY PRODUCED

BACKGROUND OF THE INVENTION

The present invention belongs to food production in which food materials in a fluid state (fluid food materials) which solidify when cooled are cooled and shaped successively at a certain thickness, and relates to a method and a device of producing two-or-more-layer laminated food from two or more sorts of food materials with different properties, and to laminated cheese food thus produced.

Laminated food produced by food materials with different properties being piled was often manufactured in accordance with a batch method making use of molds and the like conventionally. According to this method, since food materials in a fluid state can be cooled and solidified while being left at rest, there are few technical limitations to production. However, the method had a problem of the difficulty of improving productivity on account of the complicated batching, production rate, the setting area of a device, the number of workers, and the like.

In order to produce laminated food successively, it is necessary to cool and solidify food materials in a fluid state and at the same time to shape the food materials and bond the layers. Accordingly, there arise a number of factors to be considered such as fluid properties, heat transfer properties of food materials, and integrity between food materials. In particular, in the case of laminated food in which a plurality of food materials are piled in a plate form, it is impossible in principle to stir or mix the food materials after the layers are formed. Therefore heat transfer decreases inevitably and cooling efficiency lowers accordingly. As a result, the decrease in production efficiency becomes a problem.

On account of the above-mentioned problems, the successive production of laminated food has hardly been done.

In accordance with a method of successively manufacturing platy products made of a single food material, thin-plate-like cheeses or rice cakes are produced, and in accordance with a semibatch method of successively manufacturing laminated food, jellies and chocolates are produced.

Jpn. Pat. Appln. KOKAI Publication No. Hei 3-201952 (1991) discloses a means of successively producing multi-layer jelly in a semibatch method. According to the production method, however, a food material in a fluid state is poured into a mold and solidified, and then another food material in a fluid state is poured and solidified again. Therefore this method is practically identical to the conventional batch methods making use of a mold, and thus has the afore-mentioned problems.

Jpn. Pat. Appln. KOKAI Publication No. Hei 5-336870 (1993) discloses a means of successively producing multi-layer pies. According to the production method, however, a semisolid food material such as pie dough is discharged on a conveyer and piled. This food material is not in a fluid state, and is not the object of this patent application.

As described above, in order to increase the number of layers of a plurality of food materials in a fluid state successively, it is necessary to shape the food materials and bond the layers while cooling and solidifying the food materials. Accordingly, there arise a number of factors to be considered such as the way of shaping, cooling and bonding food materials, and production efficiency.

If food materials discharged in a thin plate form on a cooling and carrying side of a cooling and carrying devices are bonded to other food materials to form laminated food by means of a simisolid outer surface not yet completely cooled and solidified of the food materials, the adhesive power of the layers is greatly influenced by the surface conditions and temperature of the other food materials, the temperature of the semisolid side of the thin-plate-like semisolid food materials.

The present invention was created to solve the above-mentioned problems, and the object of the present invention is to shape, cool and solidify, and unite two or more sorts of fluid food materials which are melted by the application of heat, or are fluid at room temperature but solidify when cooled with efficiency and accuracy in order to form two-or-more-layer laminated food.

As an example of laminated food manufactured in accordance with the above-mentioned production method, there is laminated cheese food.

At present, cheese products, mainly process cheese, are not provided such that each product shaped in a plate form is wrapped separately but are provided such that from several to dozens of products are piled directly and then wrapped together. The advantage of this form of product lies in the convenience of the product being cut in advance, and in that there are not many packaging media to be thrown away after use. Since consumers are becoming more and more conscious of the need to protect the environment recently, it is expected that this type of products will be favored more and more in the future.

However, if cheeses are piled and preserved for a long time, the adjoining cheeses generally adhere to each other on the contacting surface thereof. Accordingly it becomes necessary to devise a means to prevent the adhesion and to enable each layer of the piled cheeses to come away from one another smoothly.

A variety of ways of preventing the adjoining cheeses from adhering to one another after being piled have been devised mainly with respect to process cheese.

There have been proposed methods such as a preparation method in which cheese material which contains mature cheese and inmature cheese with low maturity (matured less than a month) is used (Jpn. Pat. Appln. KOKAI Publication No. Sho 58-47432 (1983)), a preparation method in which cheese material containing 50 wt % or more of natural cheese the maturing of which is retarded or natural cheese matured less than a month is used (Jpn. Pat. Appln. KOKAI Publication No. Hei 4-179442 (1992)), a preparation method in which material cheese containing 30 wt % or more of immature natural cheese and 0.05 to 1wt % of viscous polysaccharide is used (Jpn. Pat. Appln. KOKAI Publication No. Hei 5-146250 (1993)), a preparation method in which molten salt comprising hypophosphate, tripolyphosphate, polyphosphate, or the mixture thereof is added to cheese material (Jpn. Pat. Appln. KOKAI Publication No. Hei 8-196209 (1996)), a method in which 0.15 wt % or more of whey protein is contained in entire protein (Jpn. Pat. Appln. KOKAI Publication No. Hei 8-256686 (1996)).

According to the method disclosed in Jpn. Pat. Appln. KOKAI Publication No. Sho 58-47432 (1983) and Jpn. Pat. Appln. KOKAI Publication No. Hei 4-179442 (1992) in which material cheese with low maturity is used, however, it is difficult to realize a rich savor peculiar to mature cheese, and the product tends to be hard and elastic when tasted, as is the case with immature cheese.

And according to the method disclosed in Jpn. Pat. Appln. KOKAI Publication No. Hei 8-196209 (1996) and Jpn. Pat.

Appln. KOKAI Publication No. Hei 8-256686 (1996), the target cheese is relatively hard cheese the main component of which is Gouda cheese and Cheddar cheese. This method does not provide a technique for giving releasability to extremely soft cheese such as cream cheese, or soft cheese with high water and fat.

Many methods according to the prior art have no descriptions about pH of cheese. Judging from the examples and the like, however, it is supposed that the pH ranges from about 5.5 to 6.5, and those methods do not provide a technique for giving releasability to sour cheese with high acidity and low pH (pH 5 or less).

In short, according to the conventional methods, it was impossible to shape extremely soft cheese such as cream cheese, soft cheese with high water and fat, and sour cheese with low pH, into a plate form, and thereby to form the multilayer laminated cheese.

Thus another object of the present invention is, according to the aforementioned production method, to provide laminated cheese food having an excellent savor and taste such that each layer of cheese may come away from one another smoothly even if a plurality of cheeses shaped into a plate form are piled.

DISCLOSURE OF THE INVENTION

The present invention aims at solving the problems by discharging fluid food materials such as food materials which become in a fluid state by the application of heat but gelatinize or plasticize when cooled on cooling and carrying sides of cooling and carrying devices which cool the fluid food materials, by shaping them into a plate form, and then by piling the plates.

For the purpose of piling platy food materials, it is possible to use a semisolid side not cooled enough so as to bond and unite a plurality of platy food materials, or to introduce fluid food materials as an intermediate layer between platy food materials completely solidified, and thereby to unite the two types of food materials.

As a cooling device, a rotary or steel belt cooling and carrying device and the like which rotates the fluid food materials discharged on the surface thereof and simultaneously cools the fluid food materials by a refrigerant from the reverse side may be employed.

As an example of food, there is two-layer process cheese made of heated and emulsified cheese as a food material, and the like.

In order to manufacture two-layer food, fluid food materials which solidify when cooled are quantitatively supplied successively at a certain thickness in a plate form on cooling and carrying sides of two cooling and carrying devices, and are cooled while being carried, thereby forming two monolayer platy food materials. And the two platy food materials are bonded and united, making use of the monolayer platy food materials the surface of which are not yet completely cooled and solidified thereby forming a two-layer laminated structure.

As a device for carrying out this production method, the following device is suitable. For the purpose of forming two monolayer platy food materials, the device is equipped with two pumps for feeding fluid food materials which solidify when cooled; a flow rate control device for controlling the feeding rate of flow of the fluid food materials fed from the pumps; nozzles for quantitatively supplying the fluid food materials fed from the pumps by discharging the fluid food materials successively at a certain thickness in a plate form on cooling and carrying sides of cooling and carrying devices; cooling and carrying devices for forming platy food materials by cooling while carrying the fluid food materials quantitatively supplied successively at a certain thickness in a plate form on the cooling and carrying sides; and a junction for bonding and uniting the two platy food materials making use of the surface not yet completely cooled and solidified of the platy food materials; and thereby forming a two-layer laminated structure.

In order to manufacture three-or-more-layer food, a fluid food material which solidifies when cooled is quantitatively supplied successively at a certain thickness in a plate form on cooling and carrying sides of cooling and carrying devices, and is cooled while being carried, thereby forming a monolayer platy food material, or if necessary, another fluid food material which solidifies when cooled is quantitatively supplied successively at a certain thickness in a plate form over the platy food material, is cooled while being carried, thereby forming a multilayer platy food material, and/or platy food materials are bonded and united to form a multilayer platy food material, a fluid food material is quantitatively supplied successively between the two monolayer and/or multilayer platy food materials, and thereby the two platy food materials and the fluid food material comprising the layer between the two platy food materials are united to form a three-or-more-layer laminated structure.

In order to bond the platy food materials, platy semisolid food materials cooled gradually and solidified from the side of the cooling and carrying side, or platy solid food materials are used in such way that a monolayer platy semisolid food material and a monolayer platy solid food material are bonded, or two monolayer platy semisolid food materials are bonded to each other.

As a device for carrying out this production method, the following device is suitable. For the purpose of forming two monolayer and/or multilayer platy food materials, the device is equipped with at least three pumps for feeding fluid food materials which solidify when cooled; a flow rate control device for controlling the feeding rate of flow of the fluid food materials fed from the pumps; nozzles for quantitatively supplying the fluid food materials fed from the pumps by discharging the fluid food materials successively at a certain thickness in a plate form on cooling and carrying sides of cooling and carrying devices; cooling and carrying devices for forming platy food materials by cooling while carrying the fluid food materials quantitatively supplied successively at a certain thickness in a plate form on the cooling and carrying sides; and if necessary, nozzles for quantitatively supplying the fluid food materials which solidify when cooled by discharging the fluid food materials successively at a certain thickness in a plate form over the platy food materials; and/or a junction for bonding and uniting the platy food materials to form a multilayer platy food materials; nozzles for quantitatively supplying the fluid food materials by discharging the fluid food materials successively between the two monolayer and/or multilayer platy food materials; and a junction for uniting the two platy food materials and the fluid food material comprising the layer between the two platy food materials, thereby forming a three-or-more-layer laminated structure.

It is possible to arrange a pair of rotary cooling and carrying devices rotating inward with respect to the direction in which food materials are carried so that the thickness of laminated food may be adjusted in the range of the interval between the two cooling and carrying sides, and to set up the nozzles for quantitatively supplying the fluid food materials by discharging the fluid food materials successively at a certain thickness in a plate form between the two platy food materials formed on the two cooling and carrying sides of the pair of rotary cooling and carrying devices, and to adjust the thickness of the platy food materials in the range of the interval between the two cooling and carrying sides, for the purpose of manufacturing stable multiplayer food consisting of three or more layers efficiently.

It is possible to place a pair of rotary cooling and carrying devices such that one is placed in a lower position than the other, and to place the nozzles for quantitatively supplying the fluid food materials by discharging the fluid food materials successively at a certain thickness in a plate form between the two platy food materials in a higher position than the platy food material formed on the cooling and carrying side of the lower rotary cooling and carrying device, for the purpose of contributing to a wide use of the food materials composing the intermediate layer.

It is also possible to set up an insertion portion for quantitatively supplying the fluid food materials quantitatively supplied successively at a certain thickness in a plate form, and other food materials as well for the purpose of introducing a wide variety of foods such as powdery, solid, fibrous, paste, and gel food and the like.

It is possible to mix the above-mentioned foods with the materials to be used in the intermediate layer and to introduce the mixture between two external platy food layers.

Five-layer food can be produced by introducing a monolayer platy food material as part of the intermediate layer between the two layers made of platy food materials formed as the external layers, by setting up two discharge nozzles for introducing other fluid food materials on both sides of the insertion portion of the platy food materials, and by introducing the other fluid food materials between the external layers and the monolayer platy food material composing part of the intermediate layer. By introducing three-layer platy food materials instead of the monolayer, seven-layer food can be manufactured. By repeating the above-described operations, laminated food having an arbitrary number of layers may be produced.

As can be seen from the above description, the present invention discloses a method and device of manufacturing laminated food with an arbitrary number of layers constituted in a variety of ways in a simple structure and with efficiency, based on a technique of inserting between the two layers made of platy food materials formed as the external layers another food material as described below in detail.

The production method according to the present invention may be such that a fluid food material which solidifies when cooled is quantitatively supplied successively at a certain thickness in a plate form on cooling and carrying sides of cooling and carrying devices, and is cooled while being carried, thereby forming a monolayer platy food material, a fluid food material which solidifies when cooled is quantitatively supplied at a certain thickness in a plate form over the platy food material, is cooled while being carried, thereby forming a multilayer platy food material, and/or the platy food materials are bonded and united to form a multilayer platy food material, and thereby forming a three-or-more-layer laminated structure.

As a device for carrying out this production method, the following device of producing laminated food is suitable. For the purpose of forming multilayer platy food materials, the device is equipped with at least three pumps for feeding fluid food materials which solidify when cooled; a flow rate control device for controlling the feeding rate of flow of the fluid food materials fed from the pumps; nozzles for quantitatively supplying the fluid food materials fed from the pumps by discharging the fluid food materials successively at a certain thickness in a plate form on cooling and carrying sides of cooling and carrying devices; cooling and carrying devices for forming platy food materials by cooling while carrying the fluid food materials quantitatively supplied successively at a certain thickness in a plate form on the cooling and carrying sides; nozzles for quantitatively supplying the fluid food materials which solidify when cooled by discharging the fluid food materials successively at a certain thickness in a plate form on the platy food materials; and/or a junction for bonding and uniting the platy food materials to form a multilayer platy food materials, thereby forming a three-or-more-layer laminated structure.

It is possible to set up at least three rotary cooling and carrying devices which are arranged in series, and which rotate inward with respect to the direction in which food materials are carried, and to use the rotary cooling and carrying devices to manufacture laminated food with an arbitrary number of layers constituted in a variety of ways in accordance with the number of the rotary cooling and carrying devices arranged in series and the pumps for feeding fluid food materials, which are attached to the rotary cooling and carrying devices.

One of the following means may be used effectively to achieve the above-mentioned purpose.

First, according to the constitution having at least three rotary cooling and carrying devices which are arranged in series, and which rotate inward with respect to the direction in which food materials are carried, with a rotary cooling and carrying device in the most upstream position, a first fluid food material which solidifies when cooled is quantitatively supplied successively on the cooling and carrying side thereof, shaped in a plate form of a certain thickness, cooled while being carried on the cooling and carrying side, and then the platy fluid food material becomes solidified from the side of the cooling and carrying side. Thereby a first monolayer platy semisolid food material or a first monolayer platy solid food material is formed. With a second rotary cooling and carrying device from the upstream, a second fluid food material which solidifies when cooled is quantitatively supplied successively on the cooling and carrying side thereof, shaped in a plate form of a certain thickness, cooled while being carried on the cooling and carrying side, and then the platy fluid food material becomes solidified from the side of the cooling and carrying side. Thereby a second monolayer platy semisolid food material or a second monolayer platy solid food material is formed. And if at least one of the first platy food material and the second platy food material is kept a platy semisolid food material not yet completely solidified, it becomes possible to bond and unite the surfaces of the first platy food material and the second platy food material, and thereby to form a two-layer structure. With a third and succeeding rotary cooling and carrying devices from the upstream, the two outer surfaces of the multilayer platy food materials obtained in and delivered from the rotary cooling and carrying device immediately above have already been solidified. A third and succeeding fluid food materials are quantitatively supplied successively on the cooling and carrying side thereof, shaped in a plate form of a certain thickness, cooled while being carried on the cooling and carrying side, and then the platy fluid food material becomes solidified from the side of the cooling and carrying side. Thereby a third and succeeding monolayer platy semisolid food materials are formed. The surface not yet completely solidified is bonded and united to the multiplayer platy food material delivered from the rotary cooling and carrying devices in the upstream, thereby forming a three-or-more-layer multilayer structure. And the structure is cooled until the structure solidifies completely.

Second, according to the constitution having at least three rotary cooling and carrying devices which are arranged in series, and which rotate inward with respect to the direction in which food materials are carried, with a rotary cooling and carrying device in the most upstream position, a first fluid food material which solidifies when cooled is quantitatively supplied successively on the cooling and carrying side thereof, shaped in a plate form of a certain thickness, cooled while being carried on the cooling and carrying side, and then the platy fluid food material becomes solidified from the side of the cooling and carrying side. Thereby a first monolayer platy semisolid food material or a first monolayer platy solid food material is formed. With a second and succeeding rotary cooling and carrying devices from the upstream, a second and succeeding fluid food materials are quantitatively supplied successively over the platy food material obtained in and delivered from the rotary cooling and carrying device immediately above, and thereby being shaped in a plate form of a certain thickness. The number of layers consisting of platy food materials is thus increased one by one, and the platy food materials are cooled while being carried by the rotary cooling and carrying device. The platy food materials become solidified from the side of the cooling and carrying side, thereby to form a three-or-more-layer multilayer food material, which is cooled until the multilayer food material is completely solidified.

It is possible to set up a rotary cooling and carrying device or a pair of steel belt cooling and carrying devices, and to use the rotary cooling and carrying devices to manufacture laminated food with an arbitrary number of layers constituted in a variety of ways in accordance with the number of the pumps for feeding fluid food materials, which are attached to the rotary cooling and carrying devices.

The following means may be used effectively to achieve the above-mentioned purpose.

According to the constitution having a rotary cooling and carrying device, a first fluid food material which solidifies when cooled is quantitatively supplied successively on the cooling and carrying side thereof, shaped in a plate form of a certain thickness, cooled while being carried on the cooling and carrying side, and then the platy fluid food material becomes solidified from the side of the cooling and carrying side. Thereby a first monolayer platy semisolid food material or a first monolayer platy solid food material is formed. Subsequently, a second and succeeding fluid food materials are quantitatively supplied successively in turn on the platy food material solidified and carried from the upstream of the cooling and carrying side, and thereby being shaped in a plate form of a certain thickness. The number of layers consisting of platy food materials is thus increased one by one, and the platy food materials are cooled while being carried by the rotary cooling and carrying device. The platy food materials become solidified from the side of the cooling and carrying side thereby to form a three-or-more-layer multilayer food material, which is cooled until the multilayer food material is completely solidified.

As an example of laminated food obtained in accordance with the above-described production method, there is laminated cheese food which is made by a plurality of layers being piled and then wrapped. Each layer of the laminated cheese food can be stripped easily from one another. In order to make it easy for each layer of the pile to be stripped smoothly, each layer has a laminated structure.

The laminated cheese food comprises a multilayer structure consisting of at least three layers of platy food materials. Of the multilayer structure, the two external layers consist of platy food materials containing cheese, and having releasability from the adjoining laminated cheese food when piled, while the intermediate layer consists of a platy food material having integrity with the platy food materials in the external layers, and if necessary, integrity between the platy food materials in the intermediate layer.

It is possible to use, as the platy food materials in the intermediate layer, cheese different from the cheese contained in the platy food materials in the external layers in type or tone, or cheese having higher maturity, more water or fat, and thus is softer, or having lower pH, than the cheese contained in the platy food materials in the external layers for the purpose of improving the taste and appearance.

And it is possible to have the platy food materials in the intermediate layer contain foods other than cheese which are in a liquid, paste, powdery, solid, or fibrous state for the purpose of improving the taste and nutrition.

It is possible to have the platy food materials in at least one of the external layers or the intermediate layer contain additives or raw materials for adjusting tone, and thereby to have the tones of the platy food materials in the external layers and the intermediate layer the same, so that the laminated cheese food may not look like a multilayer structure. It is also possible to have the platy food materials in at least one of the external layers or the intermediate layer contain additives or raw materials for adjusting tone, and thereby to have the tones of the platy food materials in the external layers and the intermediate layer different, so that the laminated cheese food may present a sharp contrast and look beautiful.

It is possible to pile and wrap at least two of the above-described laminated cheese food and to provide the product as laminated cheese food package so as to be distributed commercially.

BRIEF DESCRIPTION OF THE DRAWINGS

FIGS. 3 and 4 are variations of FIG. 2. FIG. 3 describes a process of producing laminated food having three layers making use of fluid food materials with low viscosity as an intermediate layer, while FIG. 4 describes a process of producing laminated food having three layers by means of an insertion portion for introducing fluid food materials and other food materials in the intermediate layer.

Symbols are used as follows. A, B represent food materials to form an external layer, C–F represent food materials to form an intermediate layer, t and t1-5 represent laminated cheese food, 1-3 and 21 represent supply tanks, 4-6 represent feed pumps, 7-9 represent flow meters, 10-12 represent nozzles, 13, 14 represent rotary cooling and carrying devices, 15, 26 represent solidification portions, 16 represents a refrigerant spray nozzle, 17 represents a scraper, 18 represents a cutting and discharging instrument, 19 represents a junction, 19' represents a junction device, 20 represents a partition board, 22 represents an insertion portion, 23 represents an added straight chain portion, 24 represents an added lateral chain portion, 25 represents a steel belt cooling and carrying device.

PREFERRED EMBODIMENTS

The embodiments according to the present invention will be described below with reference to the attached drawings.

Figure 1:
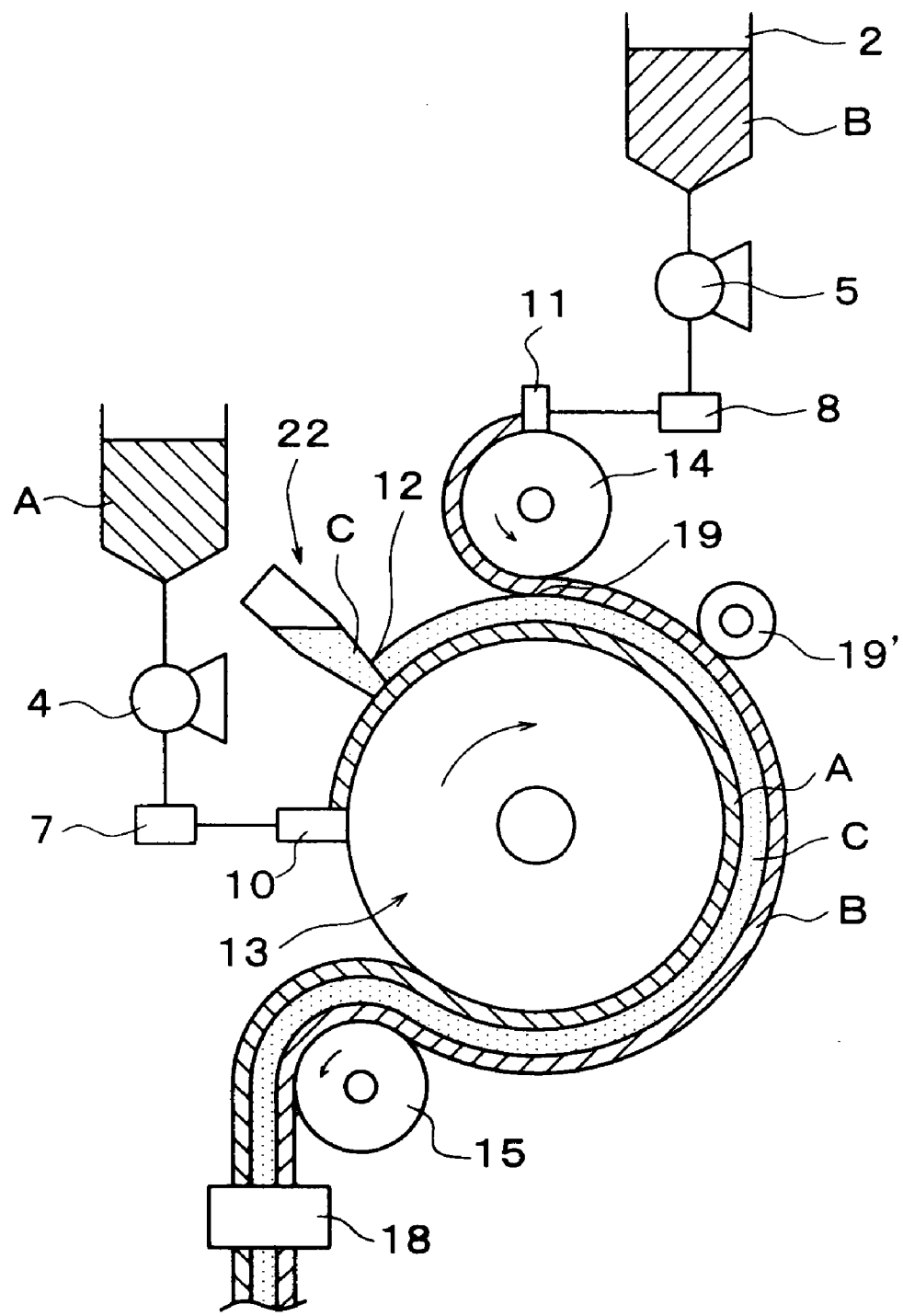
FIG. 1 describes a process of producing laminated food having two or more layers making use of two or more sorts of fluid food materials, and FIG. 2 describes a process of producing laminated food having three layers making use of three sorts of fluid food materials.

FIG. 1 describes a process of producing laminated food having two or more layers making use of two or more sorts of fluid food materials.

Two sorts of fluid food materials (A) (B) in a fluid state which solidify when cooled are stored in supply tanks (1) (2), respectively. The fluid food materials (A) (B) are made up independently of each other, and are in a fluid state by the application of heat or water. At this time, the fluid food materials (A) (B) need not be heated to the same temperature, or the viscosity or moisture of the fluid food materials (A) (B) may be different from each other. What is required is that the fluid food materials (A) (B) have rheological solid state properties of being discharged in a laminated form and that the degree of solidification thereof increase by gelation and the like when cooled.

The fluid food materials (A) (B) are carried from the supply tanks (1) (2) through the flow meters (7) (8) for measuring and controlling the rate of flow of the feed pumps (4) (5) to the nozzles (10) (11) by the feed pumps (4) (5), respectively.

In order to have the amount supplied to the nozzles (10) (11) constant, it is desirable that the feed pumps (4) (5) be metering pumps. As such pumps, constant volume pumps such as a commercially available rotary pump may be employed. If a high degree of feeding accuracy is required, a method is effective in which a process computer and others feedback the rate of flow measured by the flow meters (7) (8) set up in the downstream of the feed pumps (4) (5) to the feed pumps (4) (5), and controls the number of revolutions thereof so that the target rate of flow may be obtained.

When a solid material or fibrous food is mixed in the fluid food materials (A) (B), appropriate feed pumps and flow meters are selected. As such feed pumps, a rotary pump having a clearance through which a solid material can pass may be employed, and as a flow meter, a commercially available electromagnetic flowmeter and others may be employed.

The fluid food materials (A) (B) carried to the nozzles (10) (11) are quantitatively supplied in succession onto the cooling and carrying side of the rotary cooling and carrying devices (13) (14) respectively.

The cooling and carrying side illustrated is a metal rotating drum, on the reverse of which a refrigerant is flowed or sprayed for the purpose of continuous cooling. As a refrigerant, cooling water and brine is used in accordance with the cooling temperature. In order to prevent the refrigerant from getting in touch with the fluid food material, it is desirable that the reverse of the cooling and carrying side be enclosed space into which the refrigerant is put.

The nozzles (10) (11) are divided broadly into two categories in terms of a mechanism.

One is a drawer nozzle which is effective to a liquid which solidifies when cooled.

This type of nozzle is equipped with a box-like discharger having a relatively wide opening approximately as wide as the cooling and carrying side at the bottom with respect to the cooling and carrying side.

If the drawer nozzle is used, the fluid food material carried by the pumps (4) (5) tends to spread broadly in the nozzle. However, because the cooling and carrying side cooled at the bottom is moving, the fluid food material getting in touch with the cooling and carrying side adheres to the surface thereof and cools and solidifies, and moves as the rotating drum moves. The fluid food material to solidify becomes thicker in proportion to the cool time, that is, the movement.

In the lower front of the nozzle which is ahead in the movement direction of the cooling and carrying side there is a long slit perpendicular to the movement direction so that the moved food materials may be of a definite thickness, and the fluid food materials pass through the slit and go out of a nozzle.

If the rate of flow of the fluid food materials carried by the feed pumps (4) (5) is larger than the rate of flow of the fluid food materials adhering to the cooling and carrying side which are discharged through the slit of the nozzle, the fluid food materials supplied excessively fill the space formed by the above-mentioned box-like nozzles (10) (11) and the cooling and carrying side, and when the space becomes full, the fluid food materials come out of the top of the above-mentioned slit.

Thus the fluid food materials discharged from the nozzles (10) (11) consist of two layers of the solidified portion at the lower part of the slit and the fluid portion at the upper part thereof. Once the fluid food materials get in this state, the fluid food materials always fill the whole area of the nozzle. Thus it becomes possible to discharge the fluid food materials in a homogeneous thickness in a relatively broad area.

The rate of flow of the fluid portion can be controlled by means of the feeding rate of flow of the pumps (4) (5), while the rate of flow of the solidified portion can be controlled by means of the movement speed of the cooling and carrying side.

The other nozzle is an extrusion nozzle having an opening of the approximately same shape, length and height as the section of the discharged fluid food materials. The fluid food materials carried by the pump are pushed out of the opening. This nozzle is effective for discharging a material in a relatively narrow platy form.

As the nozzles (10) (11) for the purpose of multiplication of layers, both of these nozzle mechanisms may be used. It is also possible to combine these two types of nozzles.

The same number of both the extrusion nozzles and the drawer nozzles as the fluid food materials to be laminated on the cooling and carrying side are prepared, and the discharge position is adjusted so that the fluid food materials may be laminated. The thickness of each layer to be discharged is adjusted by the rate of flow of the feed pumps (4) (5) being changed. If necessary, in order not to disturb the already discharged layer, the next layer is discharged after the lower layer is cooled and solidified to some extent. However, if the lower layer is cooled excessively, there may occur a case in which the layers do not adhere to each other. Therefore, the extent of the cooling of the lower layer needs to be adjusted in accordance with the solid state properties of the fluid food materials used.

It is possible to combine these two types of nozzles. As described above, the position of a plurality of nozzles on the cooling and carrying side depends on the solid state properties of the fluid food materials and the movement speed of the cooling and carrying side. In the case of a fluid food material which solidifies relatively easily, it is possible to reduce the distance between the nozzles. It is possible to unite a plurality of nozzles into one unit by reducing the distance to an extreme. It is also possible to form a vertical-stripe-like layer by placing a plurality of narrow nozzles perpendicular to the movement direction of the cooling and carrying side and to introduce the layer in a multilayered food.

The food materials (A) (B) which become semisolid in the plate shape of a certain thickness by being discharged onto the cooling and carrying side from the nozzles (10) (11) and moving while being cooled, are carried to the junction (19).

The junction (19) is where the cooling and carrying sides of a pair of rotary cooling and carrying devices (13) (14) come close to each other and face each other. The rotating-roller-type junction device (19') bonds and unites the tops not yet completely cooled and solidified of the two platy semisolid food materials (A) (B).

The united two-layer platy semisolid food is further cooled and completely solidified in passing by the solidification portion (15). In FIG. 1, as the solidification portion (15), a metal rotating drum is used as in the case of the rotary cooling and carrying devices (13) (14).

The two-layer food which is completely cooled and solidified is cut and shaped by means of the cutting instrument (18) such as a slitter, and discharged by the discharging instrument (18) such as a belt conveyer.

It is possible to form three-layer laminated food by providing another fluid food material (C) between the layers of two types of food materials (A) (B).

As shown in the drawing, in the upstream of the junction (19) of the fluid food material (A) and the fluid food material (B), an insertion portion (22) for providing the fluid food material (C) is set up. On the platy semisolid food material (A) the fluid food material (C) is supplied from the nozzle (12), and on the fluid food material (C) the platy semisolid food material (B) is provided to form a three-layer laminate. The laminated food is pressurized by the junction device (19') at a constant pressure, and thereby the bonding between the layers is intensified.

The position of the junction (19) of the fluid food material (C) which is an intermediate layer may be anywhere between the nozzle (10) of the fluid food material (A) and the rotary cooling and carrying device (14) of the fluid food material (B).

Therefore it is possible to set up an insertion portion of a plurality of interlayer fluid food materials in the above-mentioned portion. For example, It is possible to add a plurality of interlayer fluid food materials by dispersing a powdery interlayer food material and then adding a small solid material.

It is also possible to constitute the insertion portion (19) of the fluid food material (C) in the same way as the supply portion of the fluid food material (B), thereby to provide the fluid food material (C) in a platy semisolid state. In this case, it is also possible to set up a plurality of insertion portions within spatial restrictions to produce a three-or-more-layer laminated food.

Since in the case of the device adopting this method, the rotary cooling and carrying device (13) cools the fluid food materials (B) (C) as well as the fluid food material (A), and also cools the bonded laminated food, a compact design is realized.

Figure 2:
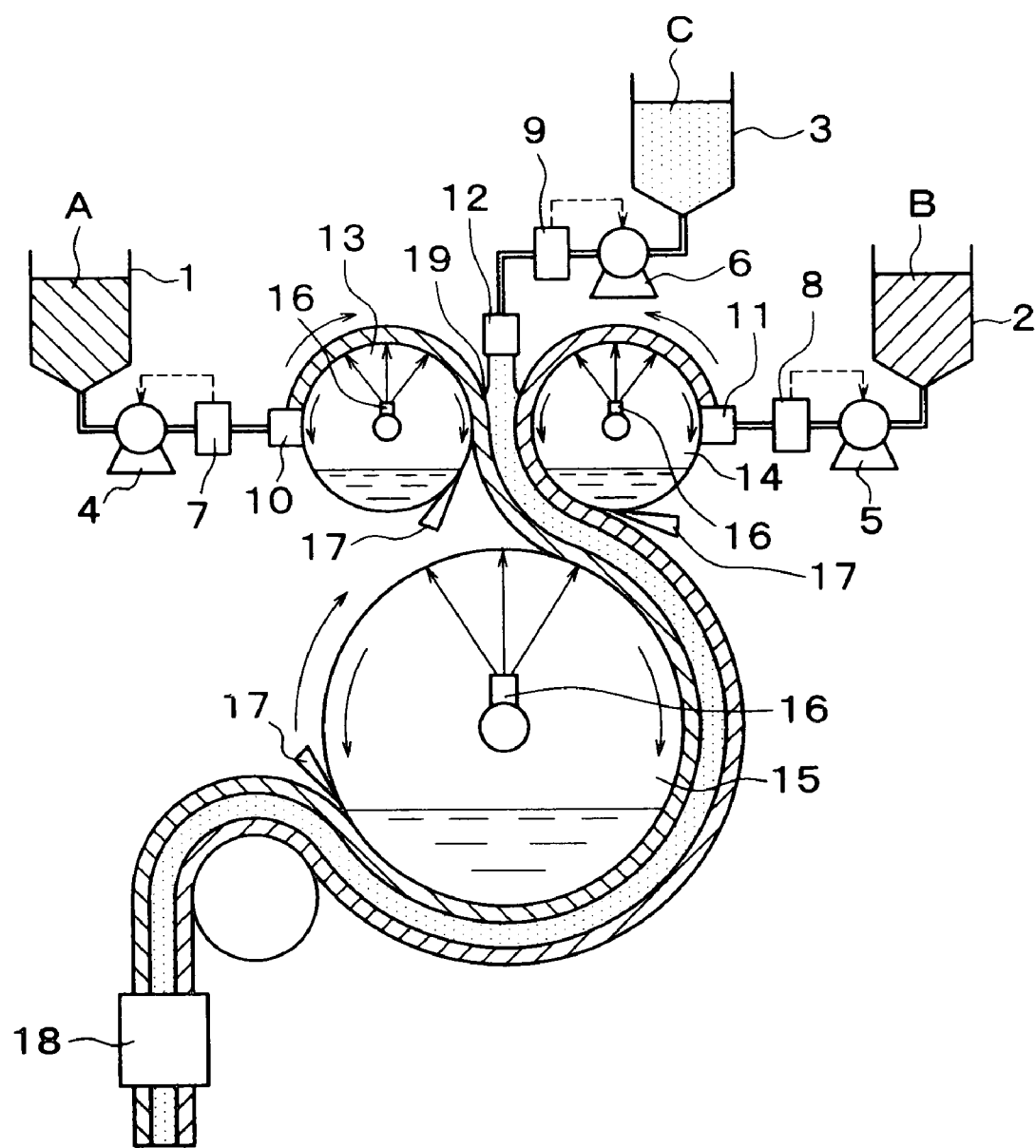

FIG. 2 illustrates a process of producing three-layer food making use of three kinds of fluid food materials (A) (B) (C).

In the description below, the portions practically identical to the portions already described will not be mentioned.

The three kinds of fluid food materials (A) (B) (C) are stored in the supply tanks (1) (2) (3), respectively. In this example, the fluid food materials (A) (B) need to have properties which enable the fluid food materials (A)(B) to be stripped cleanly from the cooling and carrying side of the rotary cooling and carrying devices (13) (14) respectively after being discharged and shaped, and to move onto the cooling and carrying side of the solidification portion (15).

The fluid food materials (A) (B) (C) are carried from the supply tanks (1) (2) (3) through the flow meters (7) (8) (9) of a flow rate controller for measuring and controlling the rate of flow of the feed pumps (4) (5) (6) to the nozzles (10) (11) (12) by the feed pumps (4) (5) (6) respectively. The fluid food materials (A) (B) carried to the nozzles (10) (11) are quantitatively supplied in succession onto the cooling and carrying side of the rotary cooling and carrying devices (13) (14), respectively.

The food materials (A) (B) shaped in the plate form of a certain thickness by being discharged from the nozzles (10) (11) onto the cooling and carrying side of the rotary cooling and carrying devices (13) (14) and then being carried while cooled from the side of the cooling and carrying side to increase the degree of solidification are transferred to the junction (19).

The junction (19) is where the cooling and carrying sides of a pair of the rotary cooling and carrying devices (13) (14) which are positioned at certain intervals which rotate inward with respect to the direction in which the food materials are carried come close to and face each other. In this example, the junction (19) corresponds to a meeting place where the distance between the two cooling and carrying sides becomes minimum.

In the junction (19), between the surfaces not yet completely cooled and solidified of the semisolid food materials (A) (B) formed like a plate on the cooling and carrying sides of the rotary cooling and carrying devices (13) (14), the fluid food material (C) carried to the nozzle (12) is quantitatively supplied in succession. As a result, the three layers are bonded and united.

It is possible to place a plurality of narrow nozzles perpendicular to the movement direction of the cooling and carrying side to form a vertical-stripe-like layer, and to introduce this layer between the semisolid food materials (A) and (B) formed like a plate.

The nozzle (12) is a sort of a drawer nozzle, and does not have a thickness adjustment mechanism. The fluid food material (C) carried by the feed pump (6) tends to spread broadly in the nozzle set up above the junction (19). However, because the semisolid food materials (A) (B) shaped like a plate are moving toward the junction at the bottom, the fluid food material (C) getting in touch with the food materials (A) (B) is carried as the cooling and carrying side moves while raising the temperature of the surface of the semisolid food materials (A) (B).

The amount of the fluid food material (C) which is inserted between the semisolid food materials (A) and (B) shaped like a plate is adjusted so that the entire thickness of the three layers may be the same as the distance between the surfaces of the two rotary cooling and carrying devices (13) (14) by the three layers passing through the junction (19).

As the nozzle (12), an extrusion nozzle may be employed. A drawer nozzle is desirable, however, for the purpose of adjusting the thickness of the fluid food material (C) between the surfaces of the two rotary cooling and carrying devices (13) and (14).

In the example shown in FIG. 2, the fluid food material (C) is supplied to the junction (19) from directly above the junction (19). Therefore when the three-layer food united at the junction (19) moves onto the solidification portion (15), the own weight thereof rests on the lowest layer consisting of the semisolid food material (A). Accordingly, if a material with extremely low viscosity is used as the fluid food material (C), there is a possibility that the intermediate layer of the three-layer food may become thick after the food passes through the junction (19).

In order to prevent this problem, the solidification portion (15) may be moved toward the rotary cooling and carrying device (13) so that the three-layer food, after passing through the junction (19), may move onto the cooling and carrying side of the solidification portion (15) maintaining the approximately vertical position. It is also possible to adopt the following method shown in FIG. 3.

The two rotary cooling and carrying devices (13) (14) are placed such that one is in a position a little higher than the other. That is, the rotary cooling and carrying device (14) is placed in a position lower than the rotary cooling and carrying device (13), and the nozzle (12) for discharging the fluid food material (C) is moved to the upstream of the semisolid food material (B).

By adopting the above-mentioned positioning, it becomes possible to ensure the time for the fluid food material (C) to be cooled and solidified by the rotary cooling and carrying device (14) after being discharged and before reaching the Junction (19). Thus the viscosity of the fluid food material (C) increases to avoid the above-mentioned problem.

The three-layer platy food material united at the junction (19) is stripped off the rotary cooling and carrying devices (13) (14) by the scraper (17) and moves onto the solidification portion (15). The food material is further cooled and completely solidified in passing through the solidification portion (15). In FIGS. 2, 3 as the solidification portion (15) a device similar to the rotary cooling and carrying devices (13) (14) is employed.

The three-layer food material which has been cooled and solidified is cut and shaped by the cutting instrument (18) such as a slitter and then is discharged outside by the discharging instrument (18) such as a belt conveyer.

Figure 4:
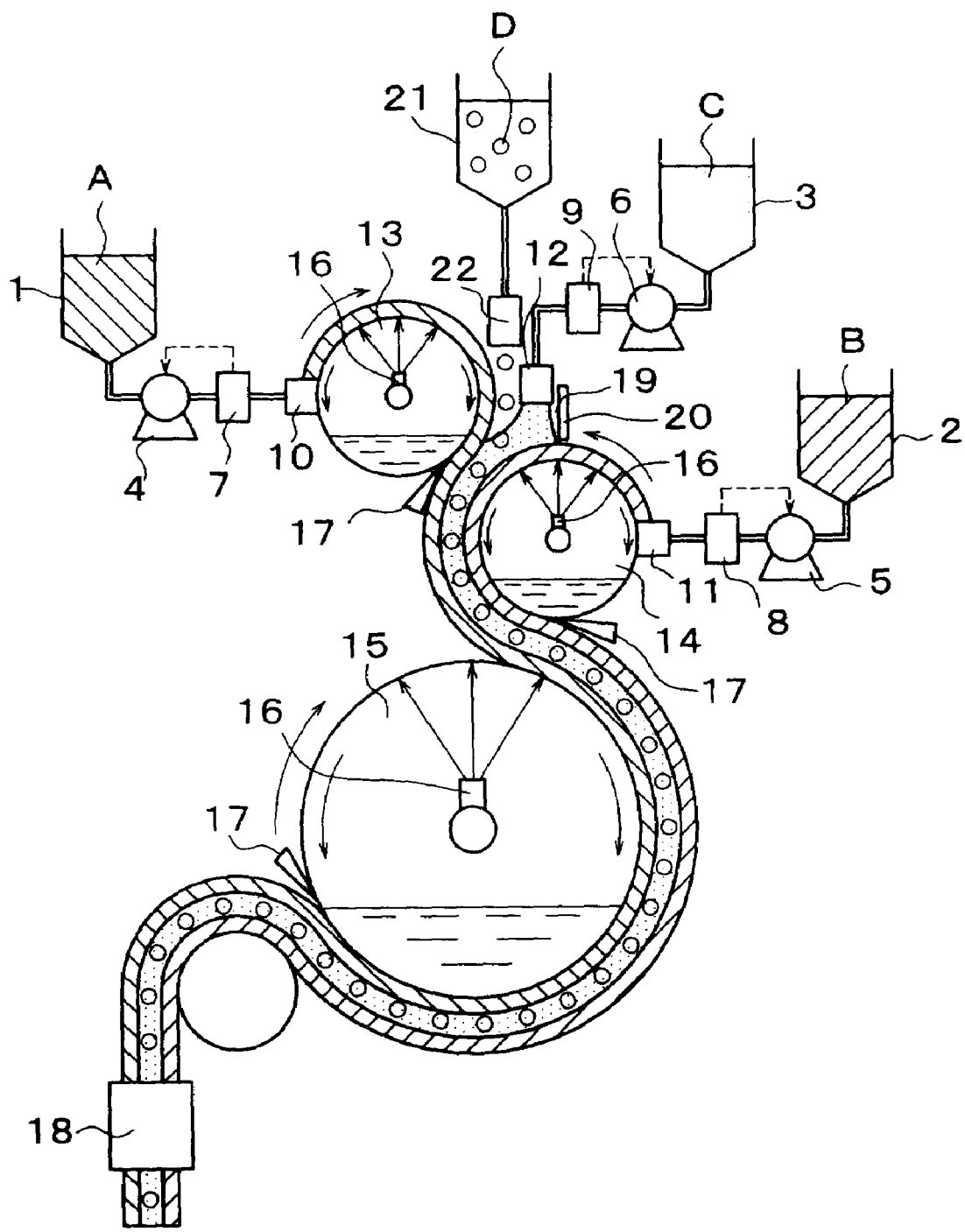

FIG. 4 illustrates a process of producing three-layer food shown in FIG. 3 to which an insertion portion (22) is added.

The insertion portion (22) supplies the fluid food material (C) and another food material (D) between the two layers formed as external layers of the platy semisolid food materials (A) and (B) from a supply tank (21). Thereby it becomes possible to introduce a wide range of food such as powder, solid materials, fibrous food, paste food, gel food as well as the fluid food material (C) as an intermediate layer.

It is possible to mix the food material (D) with the fluid food material (C) in the supply tank (3) in advance and to introduce the mixture between the two layers formed as external layers of the platy semisolid food materials (A) and (B).

By introducing a monolayer platy food from the insertion portion (22) between the two layers formed as external layers of the semisolid food materials (A) and (B), and by setting up an instrument similar to the discharger of the fluid food material (C) on the cooling and carrying side of the rotary cooling and carrying device (13), it becomes possible to produce five-layer food. That is, it becomes possible to produce five-layer food by setting two nozzles for introducing other food materials in a fluid state on both sides of the insertion portion (22), and by introducing other food materials in a fluid state between the external layer and the monolayer platy food material. By changing the number of layers of the platy food materials introduced from the insertion portion (22), it becomes possible to produce three-or-more-layer laminated food.

Figure 5:
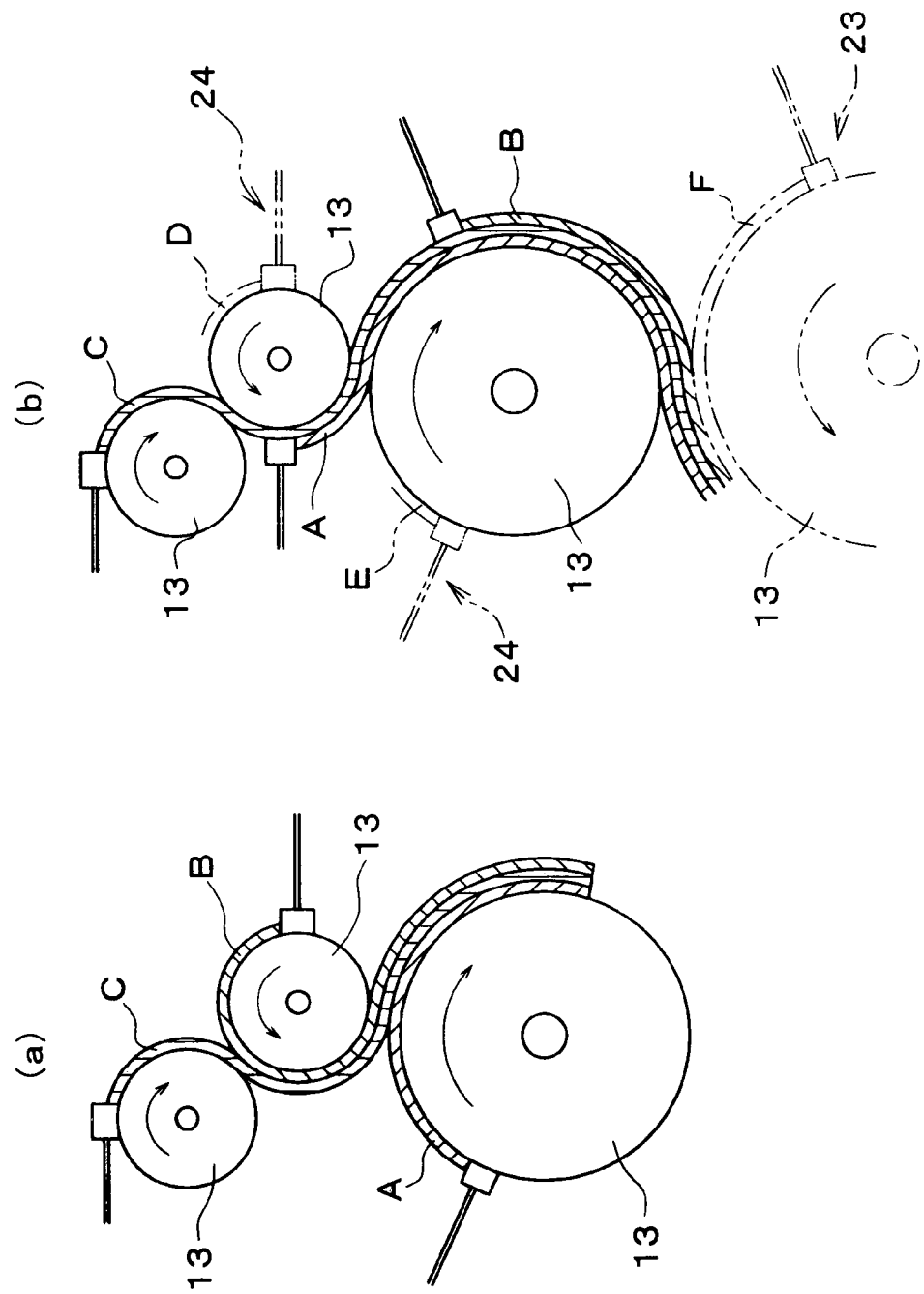
FIGS. 5 describe another method. (A) describes a process of producing three-layer laminated food according to which rotary cooling and carrying devices are arranged in series, while (B) describes a process of producing three-or-more-layer laminated food according to which rotary cooling and carrying devices are arranged in series. (C) describes a process of producing three-or-more-layer laminated food according to which fluid food materials are laminated successively on a rotary cooling and carrying device, and (D) describes a process of producing three-layer laminated food according to a method different from the method shown in FIG. 2.
Figure 5:
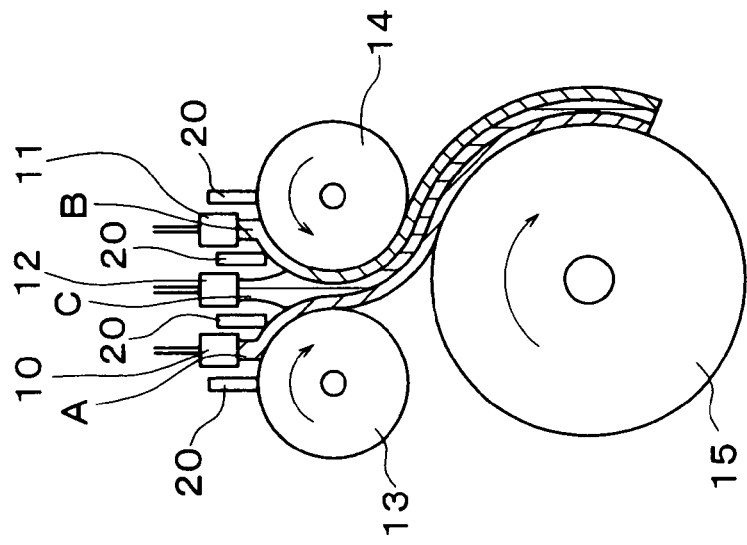
Figure 5:
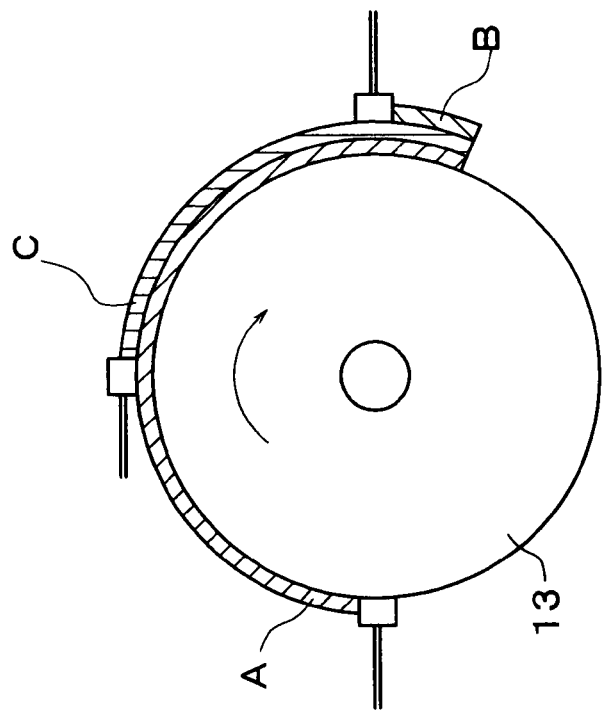

FIGS. 5 illustrate a process of producing multilayered laminated food in accordance with a method different from the production methods described with reference to FIGS. 1–4.

According to the method shown in FIG. 5(A), the tops not yet completely cooled and solidified of the platy semisolid food materials (B) (C) are bonded to each other to form two layers of platy food materials, and the cooled and solidified side of the united two layers of platy food materials and the top not yet completely cooled and solidified of the platy semisolid food material (A) are bonded to form three layers. Although it is possible to form three-layer food in accordance with this method, there may occur an adhesive failure. This is because the bonding of the third layer is done between the cooled and solidified side and the side not yet completely cooled and solidified, and therefore the bonding is susceptible to conditions of bonded sides.

Since the food material (C) composing the intermediate layer also gets in touch with the cooling and carrying side of the rotary cooling and carrying device according to this method, it is required that the food material (C) composing the intermediate layer also have properties of being stripped cleanly from the cooling and carrying side of the rotary cooling and carrying device after being discharged and shaped and of moving onto another cooling and carrying side.

According to the method shown in FIG. 5(B), first the platy semisolid food material (C) is formed and on the cooled and solidified side thereof the fluid food materials (A) (B) are discharged in order, and thereby three layers are formed. This method causes no problem for the bonding of layers, but presents some difficulty to the thickness adjustment of the external layers (A) (B) because the external layers are discharged vertically downward.

In the methods shown in FIGS. 5(A) (B), the rotary cooling and carrying devices which are arranged in series and which rotate inward with respect to the direction in which food materials are carried are employed. Accordingly if an added straight chain portion (23) having a supply means of fluid food materials and a rotary cooling and carrying device is set up further downstream of the most downstream rotary cooling and carrying device (13), it becomes possible to increase the number of layers of laminated food in proportion to the number of the added straight chain portions (23).

If an added lateral chain portion (24) having a supply means of fluid food materials is further set up in the rotary cooling and carrying device, it becomes possible to increase the number of layers of laminated food in proportion to the number of the added lateral chain portions (24).

In any case, according to the method shown in FIGS. 5(A) (B) in which the rotary cooling and carrying devices are arranged in series, the intermediate layer (C) gets in touch with the cooling and carrying side of the rotary cooling and carrying devices. According to the method shown in FIG. 5(C), this problem can be avoided.

In accordance with the method shown in FIG. 5(C), two-or-more-layer laminated food is produced by the repetition of the following operation. The fluid food material (A) is shaped and cooled on the cooling and carrying side of one rotary cooling and carrying device, and the fluid food material (C) is discharged on the semisolid food material (A)

shaped like a plate while the fluid food material (B) is discharged on the two-layer semisolid food material thus formed.

In order to avoid the problem of adjusting the thickness of the external layer (B), it is necessary to use a rather large rotary cooling and carrying device. The cooling load becomes heavy accordingly.

This method is not appropriate if a material with extremely low viscosity is used as the fluid food material (C).

Figure 6:
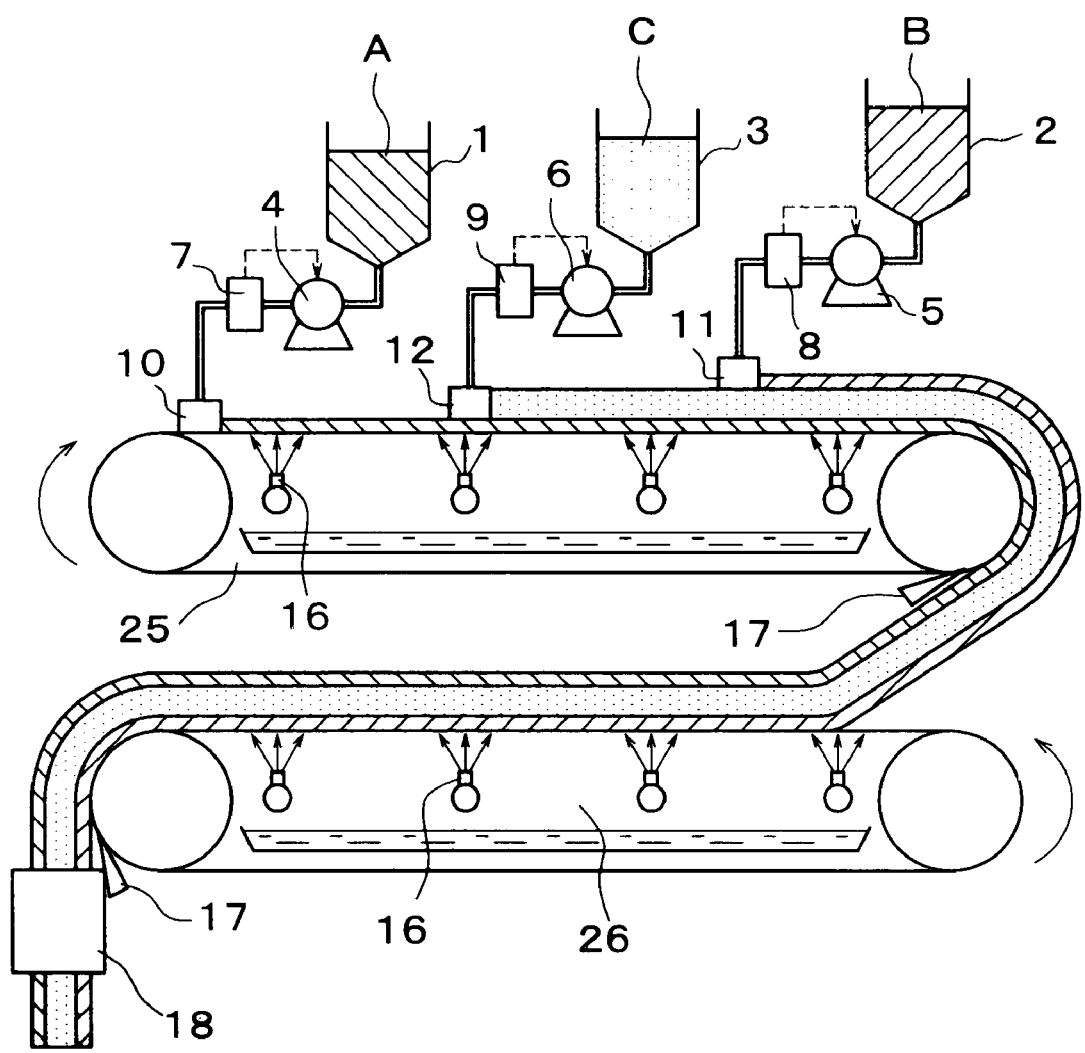
FIG. 6 describes a process of producing three-layer laminated food making use of a steel belt cooling and carrying device.

FIG. 6 shows a process of producing three-layer laminated food in accordance with a method shown in FIG. 5(C) in which a steel belt cooling and carrying device is used instead of the rotary cooling and carrying device.

The above description indicates the significance and wide use of the method of producing laminated food according to the present patent application. In FIGS. 1–4 the position of the nozzles (10) (11) on the rotary cooling and carrying devices (13) (14) depends on the solid state properties of the fluid food materials and the movement speed of the cooling and carrying sides. In the case of the fluid food material relatively easy to solidify, it is possible to reduce the distance between the nozzles, and when the distance is reduced to an extreme, it is possible to adopt the composition of the device shown in FIG. 5(D).

As described above, according to the present invention, it is possible to produce a variety of more-than-three-layer laminated food. That is, by sandwiching a variety of fluid food materials between the same sort of or different sort of platy semisolid food materials, it becomes possible to produce three-layer food having a fluid food material with low viscosity in the intermediate layer which could not be produced according to conventional manufacturing methods, and striped multilayer food produced by a wide platy food material being laminated on another narrow food material like a pinstripe. This manufacturing method also makes it possible to produce multilayer food made by an arbitrary combination of food materials of a variety of thickness and with a variety of solid state property being laminated.

As concrete examples of food materials used to produce laminated food, there are dairy products such as cheese and butter, starch, gel food such as jelly, paste and jam made from vegetables and fruits, margarine, and the like. The present invention can be applied to a wide range of food materials as long as the food materials become fluid by applying heat or water, or by kneading, and solidify by the process of gelation and the like when cooled. It is possible to provide the laminated food produced as described above after being cooked.

Figure 7:
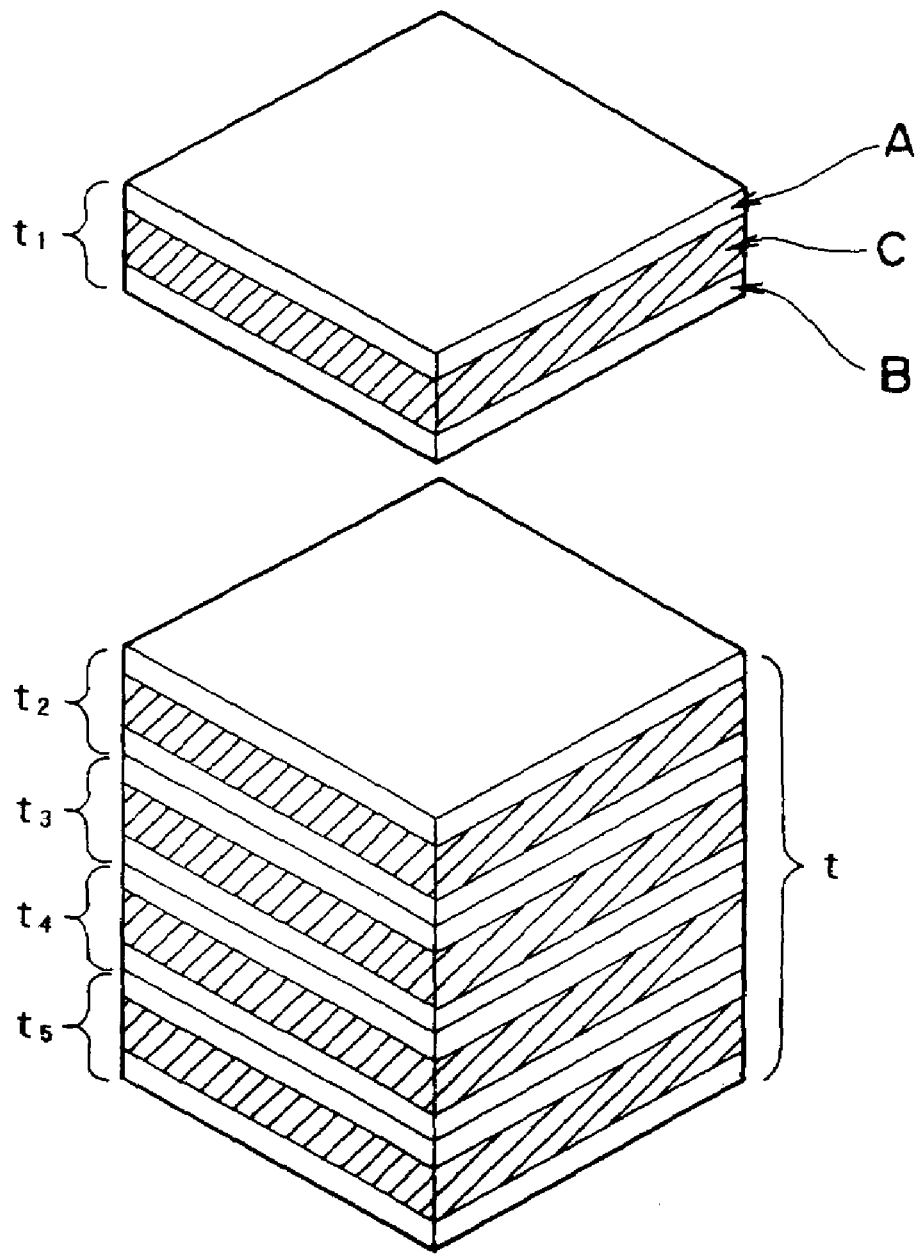
FIG. 7 is a perspective view of laminated cheese food.

FIG. 7 is a perspective view of laminated cheese food produced by the afore-mentioned device. Each laminated cheese food (t1) consists of platy food materials. That is, each laminated cheese food (t1) consists of external layers (A) (B) and an intermediate layer (C). A certain number of laminated cheese foods (t1) (t2) (t3) . . . are put on one another, and then the laminated cheese food thus produced is wrapped and provided as wrapped laminated cheese food (t).

The inventor studied eagerly to realize the above-mentioned object and succeeded in providing savor and taste not found in conventional laminated cheese food while maintaining the releasability required for practical use. The inventor adopted a multilayer structure of three or more layers for laminated cheese food (t1). In the external layers (A) (B), the inventor used a releasable platy food material containing cheese, and in the intermediate layer (C) which does not get in touch with the adjoining laminated cheese food when the layers are piled, the inventor used different sorts of cheese from the cheese contained in the external layers (A) (B), highly mature and savory cheese, extremely soft cheese with high water and fat such as cream cheese, and a platy food material other than cheese.

The inventor also found that it is possible to achieve good taste and beauty to the eye by giving different colour tones to the external layers (A) (B) and to the intermediate layer (C), or to each of the three layers (A) (B) (C), and that it is possible to achieve unexpected effect when cheese food may not look multilayer food by giving the same tone to the layers, and thereby completed this invention.

The laminated cheese food (t1) according to the present invention is multilayer food having at least three layers. Of the plurality of layers, in the two external layers (A) (B) a platy food material is used which contains cheese and which is releasable from an adjoining laminated cheese food when piled. In the single or plurality of intermediate layers (C), a platy food material having the integrity to the external layers (A) (B) and if necessary, the integrity among the intermediate layers (C) . . . is used.

The cheese in the present invention refers to the food the main component of which is cheese such as natural cheese, process cheese, cheese food containing approximately 51% or more cheese.

As the platy food material used in the intermediate layer (C), although cheese is used in the examples described below, cheese-like food or gel food may be used appropriately made from one or the combination of more than one of the following: protein such as lactic protein, fat such as milk fat, starch, a gelatinizing agent such as polysaccharide.

The external layers (A) (B) requiring releasability may be prepared in accordance with the prior art described above, and others. The intermediate layer (C) not requiring releasability needs to have shape retention such that the intermediate layer (C) does not protrude or is not transformed while preserved. As long as this requirement is satisfied, there are no limitations to the components and production method thereof.

If this requirement is satisfied, the intermediate layer (C) need not consist of one layer, but may consist of more than one layer if necessary. The external layers (A) (B) need not be made from the same component as long as the releasability thereof is good, or the thickness of the layers need not be the same. And there are no particular limitations to the thickness of the layers including the external layers (A) (B) and the single or plurality of intermediate layers (C).

The releasability in the present invention refers to properties evaluated in the following way.

Ten laminated cheese foods 55 mm long, 35 mm wide, 5–10 mm thick obtained according to the embodiments described below and others, were stocked one another. The stack was wrapped in plastic wrap, preserved at 5° C. for 48 hours, and then preserved at 10° C. for three months.

Thereafeter the laminated cheese foods were stripped one by one by hand. The number of the laminated cheese foods which could be stripped normally without sticking to the adjoining laminated cheese food was considered as the articles having good releasability. Ten sets of ten stacked laminated cheese foods were checked. The number of articles which conform to releasability was divided by 100 which is the number of all the laminated cheese foods checked, then multiplied by 100 to obtain the rate (%) of conformity to releasability. In the present invention, the releasability is defined as good if the rate of the articles conformable to releasability is 90% or more. By piling the desired number of, for example ten, laminated cheese food with good releasability, it becomes possible to give the releasability, which is one of the objects of the present invention, to the package of laminated cheese food.

The example shown in FIG. 7 is three-layer laminated food. In the case of two-layer laminated food, the intermediate layer (C) is omitted, and each laminated cheese food (t1) consists of two external layers of an upper layer (A) and a lower layer (B). The layers (A) (B) are made of cheese-containing food, having integrity between the upper and lower layers (A) (B), and having releasability from the adjoining laminated cheese food when stacked.

EXAMPLES

The embodiments according to the present invention will be described below.

Example (1)

As an example of two-layer laminated food, two-layer cheese food was produced in accordance with the composition shown in Table 1. A production device shown in FIG. 1 from which the insertion portion (19) of the interlayer food material (C) was removed was employed. A rotary cooling and carrying device was used as a cooling and carrying device, and the inside thereof was cooled by brine of −10° C. The feed pumps (4) (5) were adjusted so that the rate of flow of the food materials (A) (B) might be 90 kg/hr, and the number of revolutions of the rotary cooling and carrying devices (13) (14) was adjusted so that the thickness of the platy semisolid food might be 3 mm.

The food materials were emulsified by means of an emulsification pot at 85° C. The viscosity of the food material (A) was 34 Pa·s while the viscosity of the food material (B) was 28 Pa·s.

TABLE 1

|  | Components | Composition rate (%) |
| --- | --- | --- |
| Food material (A) | Gouda cheese | 92.0 |
|  | Sodium polyphosphate | 2.0 |
|  | Baking soda | 0.5 |
|  | Water | 5.5 |
| Food material (B) | Cheddar cheese | 94.5 |
|  | Sodium polyphosphate | 2.0 |
|  | Baking soda | 0.5 |
|  | Water | 3.0 |

The bonded two-layer cheese food was 6 mm thick, the boundary surfaces of the two layers were bonded to each other tightly, and the thickness of the layers was constant. The cheese produced in accordance with this composition has the white food material (A) and the red food material (B), therefore the two-layer cheese food presents a sharp contrast. And the boundary surfaces were stable after an approximately-one-month preservation test.

Example (2)

As an example of multilayered laminated food, three-layer cheese food was produced in accordance with the composition and constitution shown in Table 2. The production device shown in FIG. 1 was used. The cooling conditions and feeding conditions were the same as in Example (1).

As a feeder of the interlayer food material (C), a vibratory dispersing feeder was set up for interlayer food materials (C1) (C2), while a feeder similar to the one used for the food material (B) was set up for an interlayer food material (C3), and thereby supplying platy semisolid cheese.

Chipped almonds of the interlayer food material (C1) were almonds sliced to about 1 mm, and added dispersively to the platy semisolid cheese of the food material (A) so that the weight ratio of the chipped almonds might be approximately 3%. The added almond chips were fixed on the boundary surfaces of the two-layer cheese by the bonding of the cheeses.

Further, green powdered tea (C2) was used as an ingredient of interlayer food material (C). The green powdered tea was dispersed thinly and evenly between the layers. The added green powdered tea was fixed between the layers by the bonding of the cheeses, and presented a remarkable green contrast.

Further, cheese (C3) having the same composition as the food material (A) was colored red and employed as an ingredient (C3) of the interlayer food material (C). Though the cheese of the intermediate layer was half solidified at the bottom by the cooling and carrying device immediately after the discharge, the bonding could be carried out smoothly because the top of the cheese of the food material (A) maintained enough temperature. The three-layer cheese food was thus produced.

TABLE 2

|  | Components | Composition rate (%) |
| --- | --- | --- |
| Food materials | Gouda cheese | 55.0 |
| (A) (B) | Cheddar cheese | 40.0 |
|  | Sodium polyphosphate | 2.0 |
|  | Baking soda | 0.5 |
|  | Water | 2.5 |
| Intermediate | (C1) Chipped almonds |  |
| food material (C) | (C2) Green powdered tea |  |
|  | (C3) Colored cheese of the food material (A) in Table 2 |  |

Example (3)

As an example of a production method of three-layer food, three-layer cheese food was produced by means of the production device shown in FIG. 3 in accordance with the composition shown in Table 3. As illustrated, a rotary cooling and carrying device was used as the cooling and carrying device, and the inside thereof was cooled by brine of −8° C. Fluid food materials (A) (B) were used as the external layers, and the feed pumps (4) (5) were adjusted so that the rate of flow of the food materials (A)(B) might be 40 kg/hr, and the number of revolutions of the rotary cooling and carrying device was adjusted so that the thickness of the external layers might be 1.5 mm.

Fluid food material (C) was used as the intermediate layer, and the feed pump (6) was adjusted so that the rate of flow might be 80 kg/hr.

The food materials were emulsified by means of an emulsification pot at 85° C. The viscosity of the fluid food materials (A) (B) was 35 Pa·s while the viscosity of the food material (C) was 30 Pa·s.

The three-layer cheese food thus produced was 6 mm thick as a whole, the boundary surfaces of the layers were bonded to one another tightly, and the thickness of the layers was constant over time.

The three-layer cheese food thus produced had the white fluid food materials (A) (B) and the red fluid food material (C), therefore the three layers presented a sharp contrast.

And the boundary surfaces were stable after an approximately-one-month preservation test.

TABLE 3

|  | Components | Composition rate (%) |
|---|---|---|
| Food materials (A) (B) | Gouda cheese | 97.5 |
|  | Molten salt | 2.0 |
|  | Baking soda | 0.5 |
| Food material (C) | Cheddar cheese | 78.0 |
|  | Gouda cheese | 19.3 |
|  | Molten salt | 2.0 |
|  | Baking soda | 0.5 |
|  | Coloring matter | 0.2 |

Example (4)

As an example of a production method of three-layer food, three-layer cheese food was produced by means of the production device shown in FIG. 3 using cheese with high moisture and low viscosity as the intermediate layer in accordance with the composition shown in Table 4. The cooling conditions and feeding conditions were the same as in Example (3).

The fluid food materials (A) (B) were prepared with 42% target moisture, and the viscosity thereof after emulsification was 35 Pa·s, while the fluid food material (C) had 52% target moisture and the viscosity after emulsification was 18 Pa·s.

The three-layer cheese food thus produced was 6 mm thick as a whole, the boundary surfaces of the layers were bonded to one another tightly, and the thickness of the layers was constant over time. According to the preservation test, it was possible to produce the three-layer cheese food without any problem by making use of an intermediate layer of cream cheese with low viscosity and high adherability.

TABLE 4

|  | Components | Composition rate (%) |
|---|---|---|
| Food materials (A) (B) | Gouda cheese | 97.5 |
|  | Molten salt | 2.0 |
|  | Baking soda | 0.5 |
| Food material (C) | Cream cheese | 90.5 |
|  | Cheese powder | 9.0 |
|  | Stabilization agent | 0.5 |

Example (5)

7 kg domestically produced Gouda cheese matured for six months and then crushed, 3 kg domestically produced immature Gouda cheese crushed 5 days after the production, 200 g sodium phosphate as molten salt, such amount of baking soda that the finished product pH would be 6.0, and such amount of water that the finished product moisture would be 42 wt % were put in a batch kettle emulsifier, and heated to 90° C. and stirred at 100 rpm to be emulsified, and thereby yellow Gouda cheese to be used as the external layers (A) (B) was obtained.

10 kg Cheddar cheese made in New Zealand matured for a year and then crushed, 200 g sodium phosphate as molten salt, 20 g annatto coloring matter, such amount of baking soda that the finished product pH would be 5.6, and such amount of water that the finished product moisture would be 42 wt % were put in a batch kettle emulsifier, and heated to 90° C. and stirred at 200 rpm, and thereby Cheddar cheese to be used as the intermediate layer (C) was obtained. The Cheddar cheese thus obtained presented the natural color of Cheddar cheese and orange originating from the annatto coloring matter. The external layers (A) (B) and the intermediate layer (C) belong to process cheese.

The Gouda cheese thus obtained to be used in the external layers (A) (B) and the Cheddar cheese thus obtained to be used in the intermediate layer (C) were shaped while being cooled by means of the production device shown in FIG. 2. Thereby three-layer laminated cheese food (t1) was obtained. The thickness of the external layers (A) (B) thereof was 1.5 mm, the thickness of the intermediate layer (C) thereof was 5 mm, and the thickness of the laminated cheese food (t1) as a whole was 8 mm.

The laminated cheese food (t1) had the yellow external layers (A) (B) made of Gouda cheese and the orange intermediate layer (C) made of Cheddar cheese, which presented a sharp contrast, and looked beautiful.

The releasability was evaluated in accordance with the method described above. That is, the laminated cheese food (t1) thus obtained was cut such that the laminated cheese food (t1) was 55 mm long and 35 mm wide. Ten laminated cheese foods (t1) were put on one another, wrapped in plastic wrap to provide wrapped laminated cheese food (t). Then the wrapped laminated cheese food (t) was preserved at 5° C. for 48 hours and then at 10° C. for three months.

According to the test in which the laminated cheese foods were stripped one by one after the preservation, the rate of the articles conformable to releasability was 100% and the releasability was judged good.

When the laminated cheese food (t1) was tasted after being stripped, the laminated cheese food (t1) tasted extremely good with the savor of the Gouda cheese in the external layers (A) (B) being combined with the savor of the Cheddar cheese in the intermediate layer (C).

Example (6)

7 kg Cheddar cheese made New Zealand matured for a year and then crushed, 3 kg crushed immature Gouda cheese domestically produced, 200 g sodium phosphate as molten salt, 10 g annatto coloring matter, such amount of baking soda that the finished product pH would be 6.0, and such amount of water that the finished product moisture would be 42 wt % were put in a batch kettle emulsifier, and heated to 90° C. and stirred at 100 rpm to be emulsified, Thereby mixed cheese to be used as the external layers (A) (B) was obtained.

7 kg domestically produced Cheddar cheese matured for two years and then crushed 3 kg Parmesan cheese made in Italy matured for two years and then crushed, 200 g sodium phosphate as molten salt, 10 g annatto coloring matter, such amount of baking soda that the finished product pH would be 5.8, and such amount of water that the finished product moisture would be 43 wt % were put in a batch kettle emulsifier and heated to 90° C. and stirred at 200 rpm. Thereby highly mature cheese to be used as the intermediate layer (C) was obtained.

If such highly mature cheese is produced by not adopting the present invention. That is, if highly mature cheese alone is cooled, shaped in a plate form, and piled, there occurs adhesion on a touching face between adjoining cheeses and the like, and therefore it is impossible to obtain good releasability. The external layers (A) (B) and the intermediate layer (C) belong to process cheese.

The cheese thus obtained to be used as the external layers (A) (B) and the highly mature cheese thus obtained to be used as the intermediate layer (C) were processed as in the above-mentioned examples. Thereby three-layer laminated cheese food (t1) was obtained, and the thickness of the external layers (A) (B) thereof was 1.5 mm, the thickness of the intermediate layer (C) thereof was 5 mm, and the thickness of the laminated cheese food (t1) as a whole was 8 mm. The laminated cheese food (t1) was cut such that the laminated cheese food (t1) was 55 mm long and 35 mm wide, and the releasability thereof was evaluated in accordance with the above-mentioned method. The rate of the articles conformable to releasability was 100% and the releasability was judged good.

When tasted, the laminated cheese food (t1) tasted extremely good because of the rich savor peculiar to the highly mature cheese in the intermediate layer (C).

And both the external layers and the internal layer of the laminated cheese food were orange because of the annatto coloring matter, and the laminated cheese food looked like monolayer cheese food.

Example (7)

10 kg cream cheese made in Australia, 50 g locust bean gum as stabilizer, and such amount of water that the finished product moisture would be 52 wt % were put in a batch kettle emulsifier, and heated to 90° C. and stirred at 200 rpm. Thereby cream cheese to be used as the intermediate layer (C) was obtained. When the cream cheese to be used as the intermediate layer (C) was measured, the pH thereof was 4.8.

It is extremely difficult to process such cream cheese with low pH by not adopting the present invention. That is, to cool, shape in a plate form, and pile the cream cheese alone is very difficult. This is because cream cheese is extremely soft even after being cooled, therefore cream cheese is transformed easily. Accordingly, it is difficult to shape cream cheese alone in a clean plate form. Even if it is possible to shape cream cheese, it is very likely that when cream cheese are piled and wrapped to be commercially distributed, cream cheese is transformed while distributed, and there occurs adhesion between adjoining layers of cream cheese and the like, thereby the cream cheese may lose the commercial value thereof. The intermediate layer (C) belongs to natural cheese.

The cheese thus obtained in Example 6 to be used as the external layers (A) (B) and the cream cheese to be used as the intermediate layer (C) were processed as in the above-mentioned examples, and thereby three-layer laminated cheese food (t1) was obtained. The thickness of the external layers (A) (B) thereof was 1.5 mm, the thickness of the intermediate layer (C) thereof was 5 mm, and the thickness of the laminated cheese food (t1) as a whole was 8 mm. The laminated cheese food (t1) was cut such that the laminated cheese food (t1) was 55 mm long and 35 mm wide, and the releasability thereof was evaluated in accordance with the above-mentioned method. The rate of the articles conformable to releasabity was 100% and the releasability was judged good.

When tasted, the laminated cheese food (t1) tasted excellent because of the savor, refreshing sour taste and softness peculiar to the cream cheese in the intermediate layer (C).

The cream cheese in the intermediate layer (C), despite having soft state properties, had enough shape retention for practical use as a commercial product because the cheese with good releasability was used in the external layers (A) (B).

Example (8)

The cheese obtained in Example 6 to be used as the external layers (A) (B), the cream cheese obtained in Example 7 to be used as the intermediate layer (C) and 500 g almonds, which had been crushed to about 3 mm and roasted as a food material (d) to be put in the intermediate layer (C), were processed as in the afore-mentioned examples. Thereby three-layer laminated cheese food (t1) the intermediate layer (C) of which is made of cream cheese containing crushed almonds (d) was obtained. The thickness of the external layers (A) (B) of the laminated cheese food (t1) was 1.5 mm, the thickness of the intermediate layer (C) thereof was 5 mm, and the thickness of the laminated cheese food (t1) as a whole was 8 mm.

The laminated cheese food (t1) was cut such that the laminated cheese food (t1) was 55 mm long and 35 mm wide, and the releasability thereof was evaluated in accordance with the above-mentioned method. The rate fo the articles conformable to releasability was 100% and the releasability was judged good.

When tasted, the laminated cheese food (t1) tasted excellent because of the savor, refreshing sour taste and softness peculiar to the cream cheese and the taste and crispness of grained almonds in the intermediate layer (C).

When solid materials such as almonds are mixed in cheese, usually the solid materials such as almonds are put into an emulsifier such as a kettle emulsifier together with cheese and other raw materials, and are heated and emulsified. In accordance with such a usual production method, however, solid materials such as almonds are usually heated to 75° C.–95° C. together with cheese. Therefore solid materials such as almonds absorb water by the application of heat, become sodden and accordingly may lose the nice taste, or may become unsavory because of the application of heat.

In this example, however, because the almonds (d) alone were put into the fluid food material (C), and cooled immediately afterward, the almonds were not heated so much. Accordingly, the taste and savor of the almonds were maintained, and the almonds in the obtained laminated cheese food (t1) had an excellent taste and savor.

EFFECTS OF THE INVENTION

According to the production method and device of the present invention, more than one sort of fluid food materials which are solidified when cooled are supplied to the cooling and carrying device, aminated, and shaped and solidified into a plate form while being cooled and carried. Thus it is possible to shape, cool and solidify, and unite the fluid food materials with efficiency and accuracy, and thereby to form a two-or-more layer laminated food. In particular, even if only platy food materials completely solidified are used, it is possible to unite these platy food materials by employing a fluid food material as an intermediate layer.

And each laminated cheese food thus produced has a multilayered structure with at least two layers, and the external layers thereof has releasability. Therefore, each laminated cheese food can be stripped off easily even the obtained laminated cheese foods are stacked on one another.

What is claimed is:

1. A laminated cheese food, comprising:
a multilayer structure produced by piling a plurality of laminated cheese foods, each of said plurality of laminated cheese foods of the multilayer structure having at least three layers, the at least three layers including:
two external layers of platy food material containing cheese, and having inherent releasability from external layers of adjoining ones of the plurality of laminated cheese foods when piled; and
an intermediate layer of platy food material, wherein the intermediate layer may be formed of a plurality of intermediate layers of platy food material which inherently bond together, the intermediate layer being disposed between and being inherently capable of bonding to the two external layers of platy food material,
wherein each of the plurality of laminated cheese foods of the multilayer structure is releasable from the adjoining ones of the plurality of laminated cheese foods of the multilayer structure.

2. The laminated cheese food according to claim 1, wherein the platy food material in the intermediate layer is cheese different from the cheese contained in the platy food material in the external layers in type or colour tone, or is cheese having higher maturity, more water or fat, thus being softer, or having lower pH, than the cheese contained in the platy food materials in the external layers.

3. The laminated cheese food according to claim 1, wherein the platy food materials in the intermediate layer contain foods other than cheese which are in a liquid, paste, powdery, solid, or fibrous state.

4. The laminated cheese food according to claim 1, wherein:
the platy food materials in at least one of the external layers or the intermediate layer contain additives or raw materials for adjusting colour tone, and
the colour tones of the platy food materials in the external layers or the intermediate layer are the same or different.

5. A laminated cheese food package according of to claim 1 the package being formed by wrapping the multilayer structure produced by piling said plurality of laminated cheese foods, each of said plurality of laminated cheese foods having said at least three layers.

* * * * *